US010440689B2

(12) United States Patent
Van Phan et al.

(10) Patent No.: US 10,440,689 B2
(45) Date of Patent: Oct. 8, 2019

(54) METHOD AND APPARATUS FOR RESOURCE ALLOCATION IN V2V COMMUNICATIONS SYSTEM

(71) Applicant: Nokia Solutions and Networks Oy, Espoo (FI)

(72) Inventors: Vinh Van Phan, Oulu (FI); Ling Yu, Kauniainen (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/556,592

(22) PCT Filed: Mar. 11, 2015

(86) PCT No.: PCT/EP2015/055049
§ 371 (c)(1),
(2) Date: Sep. 7, 2017

(87) PCT Pub. No.: WO2016/141983
PCT Pub. Date: Sep. 15, 2016

(65) Prior Publication Data
US 2018/0063825 A1 Mar. 1, 2018

(51) Int. Cl.
*H04W 72/04* (2009.01)
*H04W 74/00* (2009.01)
(Continued)

(52) U.S. Cl.
CPC ....... *H04W 72/0406* (2013.01); *H04W 4/046* (2013.01); *H04W 52/0216* (2013.01);
(Continued)

(58) Field of Classification Search
CPC . H04W 28/06; H04W 4/046; H04W 52/0216; H04W 52/0219; H04W 72/0406; H04W 72/0413; H04W 72/042; H04W 74/00; H04W 92/18; Y02D 70/00; Y02D 70/1242; Y02D 70/1262; Y02D 70/1264; Y02D 70/142; Y02D 70/146; Y02D 70/21; Y02D 70/24
See application file for complete search history.

(56) References Cited

U.S. PATENT DOCUMENTS

| | | | | |
|---|---|---|---|---|
| 2015/0195827 A1* | 7/2015 | Feng | ................... | H04L 63/0428 380/270 |
| 2015/0326668 A1* | 11/2015 | Mader | ..................... | H04W 4/12 455/404.1 |
| 2018/0227882 A1* | 8/2018 | Freda | .................... | H04W 8/005 |

FOREIGN PATENT DOCUMENTS

| WO | 2014/005629 A1 | 1/2014 |
|---|---|---|
| WO | 2014/012244 A1 | 1/2014 |
| WO | 2016/029932 A1 | 3/2016 |

OTHER PUBLICATIONS

Harding et al., "Vehicle-to-Vehicle Communications: Readiness of V2V Technology for Application", National Highway Traffic Safety Administration, DOT HS 812 014, Aug. 2014, 327 pages.

(Continued)

*Primary Examiner* — Rina C Pancholi
(74) *Attorney, Agent, or Firm* — Brake Hughes Bellermann LLP

(57) ABSTRACT

There is provided a method comprising receiving a request from a user equipment for resource allocation for at least one service coverage zone in a coverage area of a first network, the first network comprising a plurality of nodes forming a synchronized sub-network, said nodes configured to provide a user equipment with at least one of instant radio access and cellular access, wherein the sub-network is associated with at least one cellular network which provides cellular access over the first network area and wherein said request comprises first information, allocating instant radio access resources for the user equipment for use within the at least one service coverage zone and providing an indication of said instant radio access resources to said user equipment.

11 Claims, 10 Drawing Sheets

(51) Int. Cl.
*H04W 92/18* (2009.01)
*H04W 52/02* (2009.01)
*H04W 4/04* (2009.01)
*H04W 28/06* (2009.01)

(52) U.S. Cl.
CPC ..... *H04W 52/0219* (2013.01); *H04W 72/042* (2013.01); *H04W 72/0413* (2013.01); *H04W 74/00* (2013.01); *H04W 92/18* (2013.01); *H04W 28/06* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/24* (2018.01)

(56) References Cited

OTHER PUBLICATIONS

"Scenarios, Requirements and KPIs for 5G Mobile and Wireless-System", Mobile and wireless communications Enablers for the Twenty-twenty Information Society (METIS), ICT-317669-METIS/D1.1, Apr. 2013, 84 pages.

"Vehicular Communication Systems", Wikipedia, Retrieved on Aug. 23, 2017, Webpage available at : https://en.wikipedia.org/wiki/Vehicular_communication_systems.

Hartenstein et al., "A Tutorial Survey on Vehicular Ad Hoc Networks", IEEE Communications Magazine, vol. 46, No. 6, Jun. 2008, pp. 164-171.

Chen et al., "Automotive Networking and Applications", IEEE Communications Magazine, vol. 52, No. 6, Jun. 2014, pp. 160-162.

Dressler et al., "Inter-Vehicle Communication: Quo vadis", IEEE Communications Magazine, vol. 52, No. 6, Jun. 2014, pp. 170-177.

Botsov et al., "Location Dependent Resource Allocation for Mobile Device-To-Device Communications", IEEE Wireless Communications and Networking Conference, Apr. 6-9, 2014, pp. 1679-1684.

International Search Report and Written Opinion received for corresponding Patent Cooperation Treaty Application No. PCT/EP2015/055049, dated Nov. 25, 2015, 14 pages.

Booysen et al., "Survey of Media Access Control Protocols for Vehicular Ad Hoc Networks", IET Communications, vol. 5, No. 11, Jul. 22, 2011, pp. 1619-1631.

Araniti et al., "LTE for Vehicular Networking: A Survey", IEEE Communications Magazine, vol. 51, No. 5, May 2013, pp. 148-157.

* cited by examiner

METHOD AND APPARATUS FOR RESOURCE ALLOCATION IN V2V COMMUNICATIONS SYSTEM

RELATED APPLICATION

This application was originally filed as Patent Cooperation Treaty Application No. PCT/EP2015/055049 filed Mar. 11, 2015.

FIELD

The present application relates to a method, apparatus, system and computer program and in particular but not exclusively, to smart radio access zones for vehicle-to-X (V2X) communications in 5G, where X may be, amongst others, vehicle (V), infrastructure (I) and pedestrian (P).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

SUMMARY OF THE INVENTION

In a first aspect there is provided a method comprising receiving a request from a user equipment for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information, allocating instant radio access resources for the user equipment for use within the at least one service coverage zone and providing an indication of said instant radio access resources to said user equipment.

The method may comprise providing an indication of said allocated instant radio access resources to at least one neighbouring node for use in coordination of resources with the at least one neighbouring node.

Said neighbouring node may be one of a node of said sub-network, a control entity of said sub-network and a node of the cellular network providing cellular access.

Instant radio access may comprise one to many broadcast based device to device communication using the allocated resources.

Said indication of instant radio access resources may comprise service coverage zone identity and instant radio access resource information.

Said first information may comprise at least one of service coverage zone information, and user equipment context information.

Said allocated resources may be associated with the service coverage zone.

Said allocated resources may be valid in the service coverage zone until an indication otherwise is provided.

In a second aspect there is provided a method comprising causing a request to be sent to a network node for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information and receiving an indication of allocated instant radio access resources for use within the service coverage zone.

The method may comprise providing an indication of said allocated instant radio access resources to at least one neighbouring node for use in coordination of resources with the at least one neighbouring node.

Said neighbouring node may be one of a node of said sub-network, a control entity of said sub-network and a node of the cellular network providing cellular access.

Instant radio access may comprise one to many broadcast based device to device communication using the allocated resources.

Said indication of instant radio access resources may comprise service coverage zone identity and instant radio access resource information.

Said first information may comprise at least one of service coverage zone information, and user equipment context information.

Said allocated resources may be associated with the service coverage zone.

Said allocated resources may be valid in the service coverage zone until an indication otherwise is provided.

In a third aspect there is provided an apparatus, said apparatus comprising means for receiving a request from a user equipment for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information, means for allocating instant radio access resources for the user equipment for use within the at least one service coverage zone and means for providing an indication of said instant radio access resources to said user equipment.

The apparatus may comprise means for providing an indication of said allocated instant radio access resources to at least one neighbouring node for use in coordination of resources with the at least one neighbouring node.

Said neighbouring node may be one of a node of said sub-network, a control entity of said sub-network and a node of the cellular network providing cellular access.

Instant radio access may comprise one to many broadcast based device to device communication using the allocated resources.

Said indication of instant radio access resources may comprise service coverage zone identity and instant radio access resource information.

Said first information may comprise at least one of service coverage zone information, and user equipment context information.

Said allocated resources may be associated with the service coverage zone.

Said allocated resources may be valid in the service coverage zone until an indication otherwise is provided.

In a fourth aspect there is provided an apparatus comprising means for causing a request to be sent to a network node for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information and means for receiving an indication of allocated instant radio access resources for use within the service coverage zone.

The apparatus may comprise means for providing an indication of said allocated instant radio access resources to at least one neighbouring node for use in coordination of resources with the at least one neighbouring node.

Said neighbouring node may be one of a node of said sub-network, a control entity of said sub-network and a node of the cellular network providing cellular access.

Instant radio access may comprise one to many broadcast based device to device communication using the allocated resources.

Said indication of instant radio access resources may comprise service coverage zone identity and instant radio access resource information.

Said first information may comprise at least one of service coverage zone information, and user equipment context information.

Said allocated resources may be associated with the service coverage zone.

Said allocated resources may be valid in the service coverage zone until an indication otherwise is provided.

In a fifth aspect there is provided an apparatus comprising at least one processor and at least one memory including a computer program code, the at least one memory and the computer program code configured to, with the at least one processor, cause the apparatus at least to: receive a request from a user equipment for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information, allocate instant radio access resources for the user equipment for use within the at least one service coverage zone and provide an indication of said instant radio access resources to said user equipment.

The apparatus may be configured to provide an indication of said allocated instant radio access resources to at least one neighbouring node for use in coordination of resources with the at least one neighbouring node.

Said neighbouring node may be one of a node of said sub-network, a control entity of said sub-network and a node of the cellular network providing cellular access.

Instant radio access may comprise one to many broadcast based device to device communication using the allocated resources.

Said indication of instant radio access resources may comprise service coverage zone identity and instant radio access resource information.

Said first information may comprise at least one of service coverage zone information, and user equipment context information.

Said allocated resources may be associated with the service coverage zone.

Said allocated resources may be valid in the service coverage zone until an indication otherwise is provided.

In a sixth aspect there is provided an apparatus comprising at least one processor and at least one memory including a computer program code, the at least one memory and the computer program code configured to, with the at least one processor, cause the apparatus at least to: cause a request to be sent to a network node for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information and receive an indication of allocated instant radio access resources for use within the service coverage zone.

The apparatus may be configured to provide an indication of said allocated instant radio access resources to at least one neighbouring node for use in coordination of resources with the at least one neighbouring node.

Said neighbouring node may be one of a node of said sub-network, a control entity of said sub-network and a node of the cellular network providing cellular access.

Instant radio access may comprise one to many broadcast based device to device communication using the allocated resources.

Said indication of instant radio access resources may comprise service coverage zone identity and instant radio access resource information.

Said first information may comprise at least one of service coverage zone information, and user equipment context information.

Said allocated resources may be associated with the service coverage zone.

Said allocated resources may be valid in the service coverage zone until an indication otherwise is provided.

In a seventh aspect there is provided a computer program embodied on a non-transitory computer-readable storage medium, the computer program comprising program code for controlling a process to execute a process, the process comprising receiving a request from a user equipment for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information, allocating instant radio access resources for the user equipment for use within the at least one service coverage zone and providing an indication of said instant radio access resources to said user equipment.

The process may comprise providing an indication of said allocated instant radio access resources to at least one neighbouring node for use in coordination of resources with the at least one neighbouring node.

Said neighbouring node may be one of a node of said sub-network, a control entity of said sub-network and a node of the cellular network providing cellular access.

Instant radio access may comprise one to many broadcast based device to device communication using the allocated resources.

Said indication of instant radio access resources may comprise service coverage zone identity and instant radio access resource information.

Said first information may comprise at least one of service coverage zone information, and user equipment context information.

Said allocated resources may be associated with the service coverage zone.

Said allocated resources may be valid in the service coverage zone until an indication otherwise is provided.

In an eighth aspect there is provided a computer program embodied on a non-transitory computer-readable storage medium, the computer program comprising program code for controlling a process to execute a process, the process comprising: causing a request to be sent to a network node for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information and receiving an indication of allocated instant radio access resources for use within the service coverage zone.

The process may comprise providing an indication of said allocated instant radio access resources to at least one neighbouring node for use in coordination of resources with the at least one neighbouring node.

Said neighbouring node may be one of a node of said sub-network, a control entity of said sub-network and a node of the cellular network providing cellular access.

Instant radio access may comprise one to many broadcast based device to device communication using the allocated resources.

Said indication of instant radio access resources may comprise service coverage zone identity and instant radio access resource information.

Said first information may comprise at least one of service coverage zone information, and user equipment context information.

Said allocated resources may be associated with the service coverage zone.

Said allocated resources may be valid in the service coverage zone until an indication otherwise is provided.

In an ninth aspect there is provided a computer program product for a computer, comprising software code portions for performing the steps the method of the first and/or second aspects when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
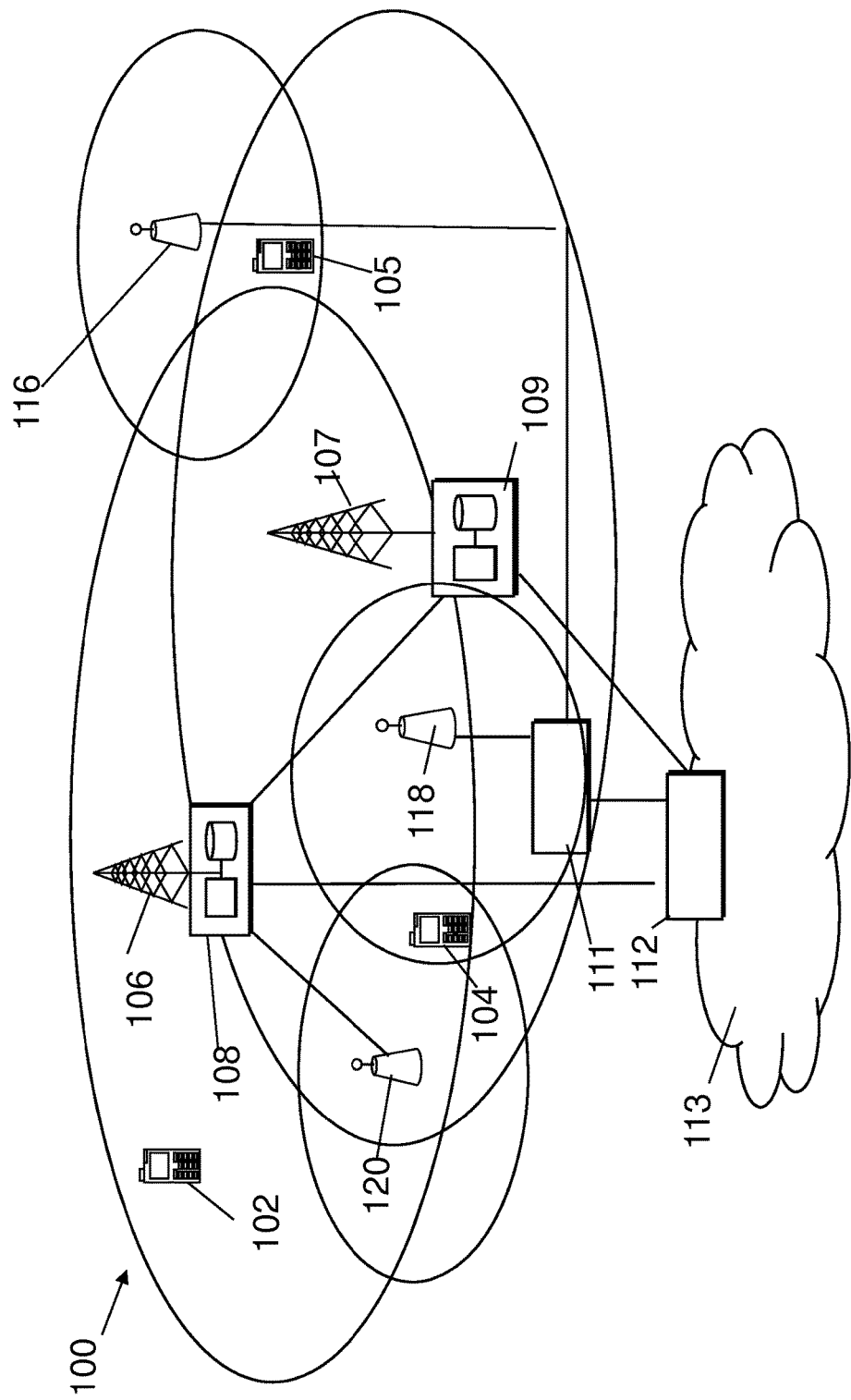
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller. The control apparatus may provide an apparatus such as that discussed in relation to FIG. 7.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

The embodiments are not, however, restricted to the system given as an example but a person skilled in the art may apply the solution to other communication systems provided with necessary properties.

Figure 2:
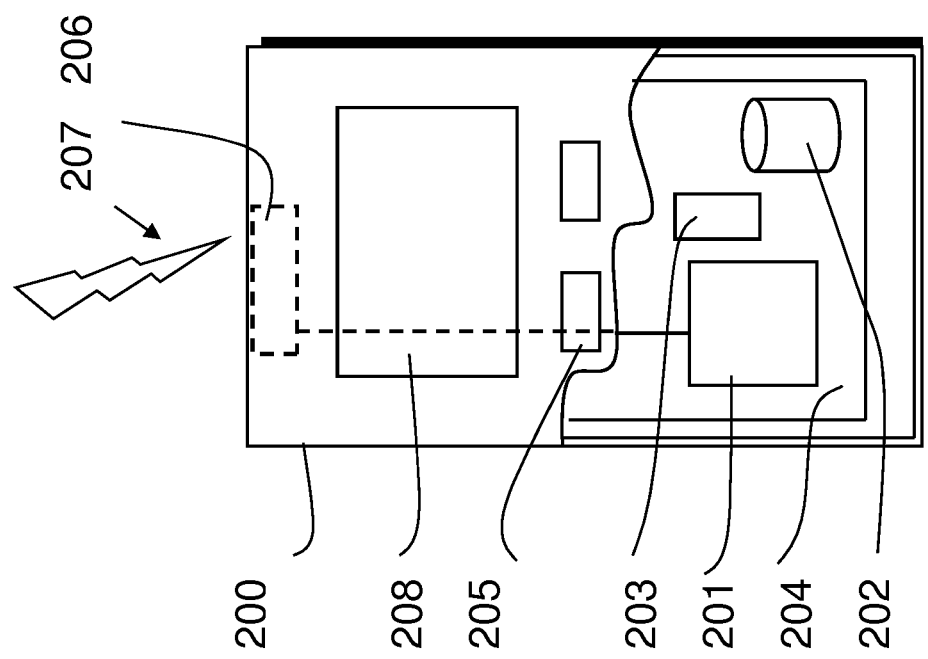
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206.

The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/ Medium Access Control/Physical layer protocol (RLC/ MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Another example of a suitable communications system is the 5G concept. Network architecture in 5G may be quite similar to that of the LTE-advanced. Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. 5G may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent Providing fast and reliable V2X communications has been identified as a key enabler for 5G. Support of vehicular communication in 5G is expected to enable a range of applications and services with different characteristics and requirements. Applications may include, but are not limited to, safety related applications and full handling or controlling of cars by the vehicles themselves. Facilitating a free flow of data, which may be real-time with different levels or classes of traffic load and traffic priority, is desirable. for vehicular communications between a vehicle and other vehicles and/or other roadside devices within a specified proximity range and communication between an authenticated and authorised vehicle device (including UE) and a serving radio access network.

A method for using current cellular technologies, for example, 3GPP LTE-A Rel'12 ProSe D2D discovery and communications, with certain enhancements proposed for facilitating fast and reliable V2X communications has been suggested. This method is based on adaptive 1:M broadcast based D2D transmissions between vehicle device and vehicle device and between vehicle device and designated roadside unit which is a part of an instant radio access (instant synchronized D2D based radio access) network coverage layer. In one embodiment, the instant radio access network coverage layer is denoted as i-RAL.

1:M (one to many) broadcast based D2D (Device-to-Device) communications using dedicated or commonly shared spectrum resources, similar to that being specified in 3GPP Rel'12 for ProSe D2D discovery and communications, may allow a capable receiving device to receive D2D communications from a transmitting device in its proximity without need of D2D discovery and connection establishment with the transmitting device beforehand. That is, as long as the receiving device is provided with a valid resource pool to monitor and receive D2D transmissions sent by any transmitting devices within its proximity, the receiving device is able to receive D2D communications transmitted by those transmitting devices. The transmitting devices, on the other hand, may be: (i) allowed to select resources from a preconfigured transmission resource pool to transmit for 1:M broadcast based D2D communications autonomously; or (ii) configured with dedicated resources by a serving radio access network (RAN) for D2D transmissions. There is no control plane needed for the air interface over the D2D link. This kind of 1:M broadcast based D2D communications may provide instant packet access and proximity communications between devices. 1:M broadcast based D2D communications may be applicable for V2V communications.

For V2V communications, 1:M broadcast based D2D communications must be adopted in a fast moving or high mobility environment of vehicles' devices with/without SIM or regardless of operators to ensure fast and reliable V2V communications for, e.g., safety related applications and services in highways scenarios for examples.

In one example arrangement, a network deployment arrangement has been proposed, in which Road-Side Units (RSU) which are deployed along the road sides, e.g., mounted on roadside lamps for instance, provide individual local area radio access points for V2X communications (X may stand for either Vehicle, denoted as V, or Infrastructure, denoted as I or pedestrian denoted as P). The RSUs are considered as designated devices which are primarily capable of being involved in direct 1:M based D2D communications of cellular networks with vehicles' relevant devices. The RSUs are deployed and configured to form an instant synchronized D2D based radio access network coverage layer, denoted as i-RAL, for supporting V2V communications over a certain service area of interest (e.g., a certain highway). That is, i-RAL is considered as a synchronized network of a number of designated D2D capable cellular devices which are deployed together as RSUs and configured to act as D2D agents of a serving cellular network in supporting V2V communications over a certain service area of interest. Individual involved vehicles' devices under the coverage of i-RAL may communicate with each other and RSUs of i-RAL instantly using 1:M broadcast based D2D communications on preconfigured spectrum band with either dedicated or commonly shared resources. The serving network may be, for example an E-UTRAN network or a 5G system with network architecture as discussed above.

Individual RSUs of i-RAL may be configured to transmit certain D2D synchronization signals (D2DSS) synchronously throughout i-RAL with a certain recognizable pattern, e.g. the same D2DSS to be transmitted by all RSUs of the same i-RAL, to provide D2D synchronization references for V2V communications within the iRAL coverage. A specific pattern of D2DSS sequences may be assigned per i-RAL instead of per RSU. Furthermore, RSUs of i-RAL may be configured to broadcast some messages for i-RAL and V2V service discovery purposes. An i-RAL specific synchronization signal may make configuration easier and reduce the time for discovering the synchronization in UEs by limiting the synchronization space.

i-RAL as a whole may be made visible to V devices. The visibility of i-RAL as a whole means that a UE may not see each RSU as an individual unit, but only see the whole service area provided by i-RAL. When UEs are under coverage of i-RAL they may receive a specific indication as discussed below and optional V2V communication related configuration (e.g. transmission mode, resource pool or destination ID etc.) related to data delivering of different kind of applications. The V2V communication related configuration may take into account the specific nature of the different applications. So, when a UE is making a transmission within i-RAL, the transmission is handled in a specific way although the transmitter and receiver have not discovered each other beforehand.

Availability of i-RAL may be indicated to V devices to allow V devices to enable V2V services with i-RAL supports when V devices are moving into the coverage of the i-RAL. The indication may be provided by the serving network via either common or dedicated control signalling, in form of, e.g., i-RAL identity or any discoverable or derivable i-RAL specific feature or information such as i-RAL specific reference signals or related D2D resources. Alternatively, or in addition, the indication of i-RAL may be provided by individual RSUs of the i-RAL, e.g., in the form of i-RAL specific pre-configured D2D synchronization signals as proposed above.

RSUs of i-RAL may be interconnected with each other (and to e.g. the internet) using possible wired or wireless connections as preconfigured, forming a local signalling and data forwarding sub-network of RSUs in order to facilitate simple and effective forwarding between RSUs within the i-RAL. An RSU is considered as a designated multi-user content re-broadcasting agent device involved in direct D2D communications with individual V devices rather than a conventional access point (AP) which provides radio access toward the network or relaying device. However, these RSUs may be integrated into deployed local 5G APs for providing V2I (Vehicle-to-Infrastructure) as well.

Half-duplex operation problem, hidden terminal problem, or contention problem may be encountered in urgent V2V communications. The half-duplex operation problem refers to cases in which involved V devices may transmit their individual urgent messages to each other simultaneously and therefore cannot hear from each other. The hidden terminal problem refers to cases in which, for examples, a large lorry running in between 2 cars on the highway is blocking the 2 cars from direct seeing and communicating for urgent safety related application such as warning and assisting in overtaking the lorry by the car from behind. The contention problem refers to cases in which involved V devices may autonomously select the same resources from a preconfigured common resource pool and transmit simultaneously resulting in collision.

Depending on, e.g., types, requirements or characteristics of involved vehicles' devices, user profiles, applications and services, V2V communications may be realized using: either (i) direct mode with direct D2D between V devices based on e.g. the autonomous D2D communications specified in 3GPP Rel'12 ProSe for PS usage; or (ii) i-RAL assisted mode with direct D2D between V devices and RSUs of i-RAL, where i-RAL is acting as a mediating and collective rebroadcasting layer which is not user-specific or (iii) both.

The following are examples of how the modes (i) to (iii) described above may be applied. Mode (iii) may be applied for, e.g., high-reliability emergency messaging or urgent safety related applications and services for both SIM and SIM-less V devices. Mode (ii) may be applied for, e.g., flooding delay-tolerant collective warning messages or collecting sensing or monitoring data along the highways. Mode (i) may be applied for, e.g., announcing or advertising direct discovery or less delay-and-reliability sensitive messages for common road monitoring purposes.

Different resource pools may be configured for modes (i)-(iii) so that RSUs know V devices intend to have either direct or i-RAL assisted V2V communication mode or both based on the resource pool and therefore determine if rebroadcast is needed or not.

The destination ID in D2D communication may be (re) used to indicate which one of (i)-(iii) V devices intend to have for V2V communications of interest, as noted above. For this, different preserved or predefined destination ID or ID group may be configured for mode (i)-(iii). RSUs, based on destination ID in either D2D related L1 control information or D2D PDU, may determine if rebroadcast is needed or not.

The destination ID in D2D communication may be (re) used to indicate what kinds or QoS classes or profile types of V2V communications' devices, user profiles, applications and services intended to have for ongoing V2V communications.

For (ii), QoS driven corresponding coordinated resource pools are provided for transmissions from V devices to i-RAL and then from i-RAL to V devices for certain QoS class of V2V communications, as semi-statically preconfigured or more dynamically configured and controlled by the serving network via, e.g., the serving E-UTRAN (macro eNB and/or integrated APs).

For contention resolution, assuming that transmitting V devices autonomously select resources from a preconfigured resource pool to transmit to RSUs, the transmitting V devices in the mode (ii) upon hearing collective rebroadcast back from RSUs may detect whether their individual messages are lost or collided previously or not and decide if a retransmission is needed.

The transmission modes (i), (ii) and (iii) may be pre-mapped to be used with certain applications and certain devices or the devices are making the mapping dynamically triggered by applications or connected devices. In the actual transmission a UE may select the transmission mode based the mapping. The i-RAL layer may handle the data delivering according the selected transmission modes based on information received in conjunction with the data transmission or the corresponding resource pool. The serving EUTRAN may monitor the resource usage of the transmission modes for control and pre-configuration of i-RAL layer.

The destination ID may be sent in one part in D2D related L1 control information and in another part in the header of L2 MAC PDU. Hence, at least some part of the destination ID addressing space as well as the corresponding signalling fields in L1 or L2 may be utilized for different indicating purposes, such as indicating different treatment profiles, modes, types or classes of V2X communications, especially when common resource pools are applied for many different sorts of V2X communications. The destination ID addressing space may be utilized on L1 level or L2 level or both with a combination of the 2 spaces L1 ID and L2 ID or a combined space of higher layer ID. A single space on L1 level may be sufficient for V2X communications.

Figure 3:
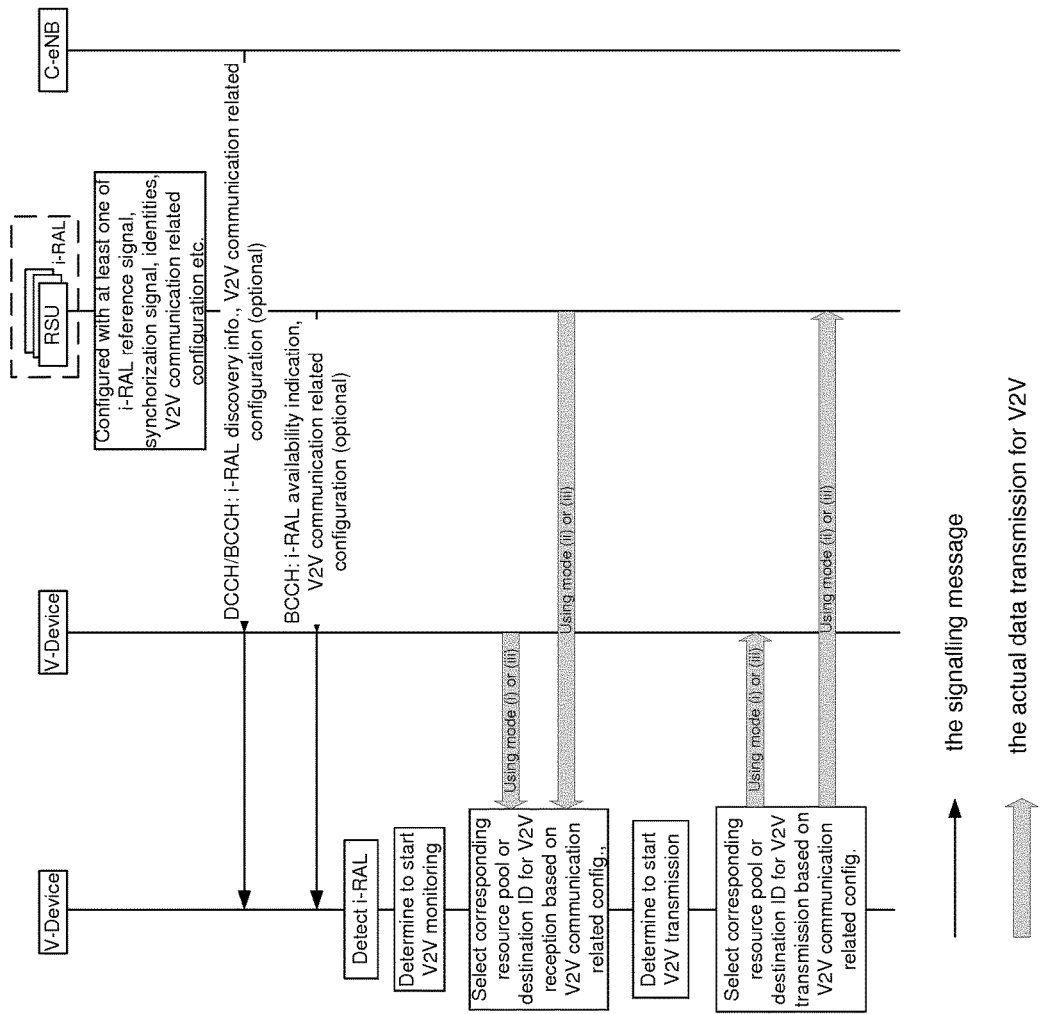
FIG. 3 shows a flowchart of an example method of V2V communication.

FIG. 3 illustrates one example of the procedures on proposed V2X communication facilitated via i-RAL and based on D2D communication. The RSUs may be configured either by e.g. OAM or a controlling serving network entity (e.g. controlling eNB or RSU integrated AP). The i-RAL related configuration may be performed when i-RAL is deployed and/or formed or dynamically. Configuring i-RAL when the i-RAL is deployed and/or formed may be preferable for pre-defined configuration from O&M. Configuring i-RAL dynamically may be more suitable for dynamic configuration from controlling eNB. From V device perspective, i-RAL and V2V communication related configuration may be either pre-configured as discussed below in (i) or configured via controlling eNB as discussed below in (ii). In both case, the RSUs that form the i-RAL need to indicate the availability of i-RAL in order to allow V devices to discover/detect i-RAL and enable corresponding V2V services. In addition, the V2V communication related configuration (e.g. the transmission modes and corresponding resource pool or destination IDs and related mapping configuration on V2V type, requirements or characteristics, user profile, applications and services) may be provided by i-RAL if not pre-configured or provided by controlling eNB. Based on those configurations, V devices can detect the i-RAL and determine the actions (e.g. select the right transmission mode and corresponding resource pool or destination group ID) on V2X communication accordingly.

It has been observed that most of data flows related to road safety and traffic efficiency applications of vehicles' communications are localized or specific to certain roads whereas remote vehicle tracking and monitoring, information or entertainment applications for human consumption aboard may require remote network access. It is further observed that there may be many individual communication devices or machines aboard a vehicle which may be involved in some wireless communications. The possibility of using the same communication platform for all radio access communications from a vehicle may be rather desirable in terms of exploring and exploiting user contexts, diversities, co-operative networking techniques for secure and efficient spectrum and network resource utilization, network performance, quality of service and end-user experience.

i-RAL may, in one example, have 2 modes of resource allocation and operation: (i) autonomous operation based on pre-configurations for i-RAL as well as all relevant individual devices; and (ii) network assisted operation based on coordination and control provided by at least one serving E-UTRAN. Both of the layers may be considered as integrated parts of 5G network.

For the first mode (i), related to providing D2D synchronization references for V2V communications described above, a common synchronization reference or source for i-RAL may be provided by a wired or wireless network connected to i-RAL, as preconfigured.

For the second mode (ii), a mobile cellular radio access layer provided by serving E-UTRAN may be facilitated over i-RAL for relevant devices aboard vehicles including UE, also referred to as V devices. In addition, the serving E-UTRAN may coordinate and control the overall i-RAL including individual RSUs or APs thereof as well as relevant V devices and V2X operations. For examples, the serving E-UTRAN consisting of macro eNB may provide synchronization reference and related common control signalling for i-RAL as well as dedicated control signalling for individual involved devices (on macro cell basis).

For the serving network to support the proposed V2X communications with i-RAL, macro eNB or RSU integrated AP may need to indicate (in system information blocks (SIB) or via dedicated signalling) the support of V2V communications to V devices, including the availability of i-RAL: i-RAL identification and semi-static configuration for i-RAL and service discovery; transmission and/or reception resource pools for V2V communications of interests including direct V2V and i-RAL assisted V2V which may be specific to certain classes of users and services, i.e., depending on types, requirements or characteristics of V2V communications' devices, user profiles, applications and services.

From spectrum use and sharing perspectives, V2V communications should be enabled regardless of home and serving operators' networks. Thus, resource pools on single-frequency spectrum band or carrier dedicated to V2V communications or at least specific application and services thereof may be preferable.

There will be coordination between transmission pools for V devices and RSUs (and corresponding reception pools thereof) in i-RAL assisted V2V communications specific to certain urgent application and service to resolve the half-duplex operation problem or the hidden terminal problem within a specific delay. For examples, corresponding Tx slot or subframe for RSUs are shifted with k slots later than that for V devices resulting in a (k+1) slot delay for i-RAL assisted V2V transmission. This coordination might be explicitly or implicitly indicated to receiving devices so as to decide to monitor and receive V2V communications in an energy efficient fashion, e.g., avoiding duplicating reception or utilizing repetition for combining or reassuring purposes.

The following relates to dedicated resource allocation for an admitted vehicle's user device to transmit in instant D2D communications between the admitted user device and RSUs and/or between the admitted user device and other vehicles' devices for a set of targeted applications and services within a smart multi-tenancy, multi-service communication zone, denoted as SM-Zone. In the above proposed network, it is assumed that in the network system under consideration, the roadside units (RSU) which are deployed along the road sides, e.g., mounted on roadside lamps for instance, are small access points or base stations enhanced and equipped with D2D capable devices so as to be capable of not only providing small cell coverage to cellular access capable devices but also being involved in direct 1:M broadcast based D2D communications, with relevant devices aboard individual vehicles.

Considering a highway use case scenario for a more specific example, RSUs deployed along the highway may be configured to form a localized radio access layer or sub-network of which the i-RAL described with respect to FIG. 3 is one example which provides instant radio access without dedicated radio connection establishment beforehand for a device using direct 1:M broadcast based D2D communications mode between the device and one or more local RSUs as well as regular cellular access mode with dedicated radio connection established between the device and the selected one of RSUs.

In addition to the localized radio access layer, it is assumed that a macro cellular mobility coverage radio access layer over the highway is provided by some serving cellular network, in one example, an LTE-A network, which may coordinate and control at least part of the instant radio access layer, RSUs thereof as well as vehicles' communications modes of operation and resources to be used under the coverage layers. Both of the layers are considered as integrated parts of 5G network.

In a broad conceptual view, an SM-Zone is considered as a flexible service coverage zone within the overall radio access coverage area provided by a subset of the localized radio access layer or sub-network formed by a number of deployed local access nodes (AN) whether interconnected or not under assistance or control of a serving macro mobility layer (e.g., macro E-UTRAN) if available or under control of the local sub-network controller, designated to provide a set of radio-access applications and services for targeted users or groups of users. SM-Zones assume the local access layer formed by RSUs or ANs capable of providing both regular cellular access and instant radio access using 1:M broadcast based D2D communications for vehicles' devices as well as users' devices aboard vehicles, as described above. The use of flexible SM-Zone may allow for efficient support of V2V communications in cellular network environment, adapted to diverse and demanding applications and services of vehicles communications (low-latency, high-mobility, high reliability, multi-service and multi-tenancy) as well as dynamic nature of on-road traffic load distributions and behaviours over time and space (different kinds or different sections of roads, different kind of traffic load distributions and behaviours in different time zones of the day in different weather conditions, seasons, etc.).

Figure 4:
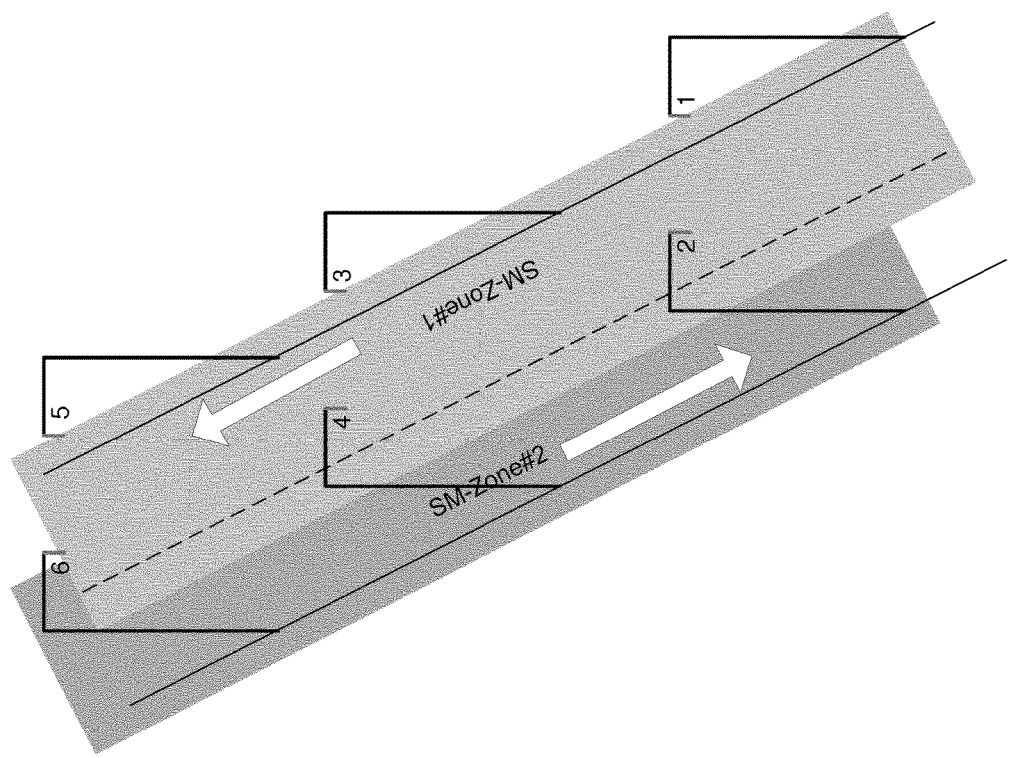
FIG. 4 shows a schematic diagram of two SM-Zones

FIG. 4 shows a schematic diagram of two service coverage zones or SM-zones. The SM-zone comprises road-side units (RSU). In this example, it is assumed that the RSUs which are deployed along the road sides, e.g., mounted on roadside lamps for instance, are small access points or base stations enhanced and equipped with D2D capable devices so as to be capable of not only providing small cell coverage to cellular access capable devices but also being involved in direct 1:M broadcast based D2D communications, as specified in 3GPP Rel'12 ProSe D2D communications for example, with relevant devices aboard individual vehicles. In the example shown in FIG. 4, a first SM-Zone is provided by RSUs #1, #3 and #5 and a second SM-Zone is provided by RSUs #2, #4, and #6.

The following relates to dedicated resource allocation for an admitted vehicle's user device to transmit in instant D2D communications between the admitted user device and RSUs and/or between the admitted user device and other vehicles' devices for a set of targeted applications and services within a specific SM-Zone. Targeted applications and services may include, for examples, on-road mission critical, accident-prone or autopilot related applications and services. Examples of applications and services include but are not limited to, support for ambulances or police cars in critical missions, accident-prone large transportation vehicles, or high-end consumer cars with advanced driving autopilot features activated. These kinds of applications may require constant, fast and reliable exchange of a large amount of information between the cars and the surrounding local environment. Rel'12 ProSe D2D discovery and communication may support both dedicated and autonomous modes of resource allocation for D2D transmissions. In the dedicated resource allocation mode, the serving eNB dynamically schedules D2D transmissions for transmitting UE being in CONNECTED state on the serving cell basis and therefore regular cell-to-cell mobility management is applied. However, the nature of D2D communications in Rel'12 ProSe D2D, aiming for public safety mission critical voice group calls in incident scenes or less delay critical proximity discovery for commercial users, may be rather different from that of vehicles' communications, especially when aiming for the aforementioned applications and services which have much more demanding reliability and delay requirements and not to mention implications of high mobility associated with vehicles.

Figure 5A:
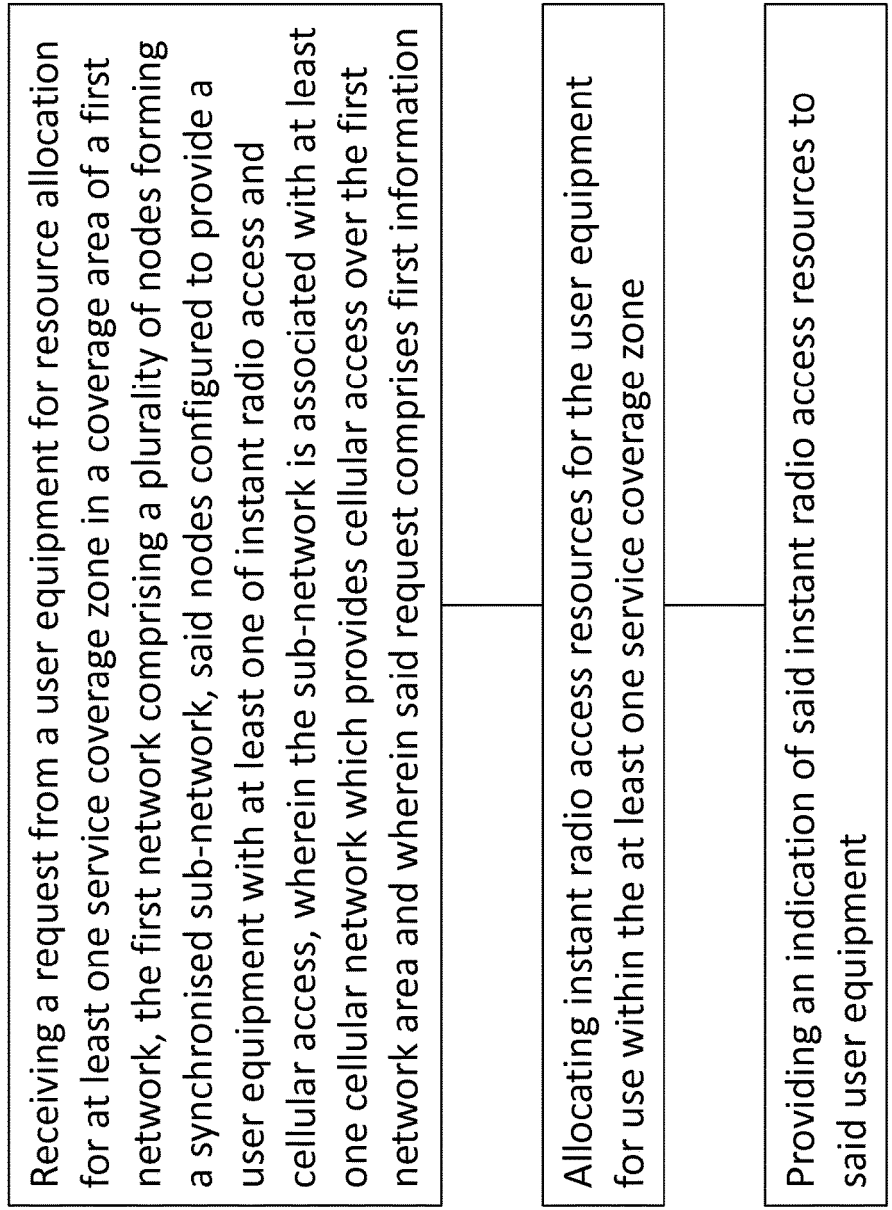
FIG. 5a shows a flowchart of an example method of resource allocation for targeted users in an SM-Zone.

FIG. 5a shows a flowchart of a method of resource allocation in an SM-zone. The method comprises, in a first step, receiving a request from a user equipment for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information, in a second step, allocating instant radio access resources for the user equipment for use within the at least one service coverage zone and, in a third step, providing an indication of said instant radio access resources to said user equipment.

Figure 5B:
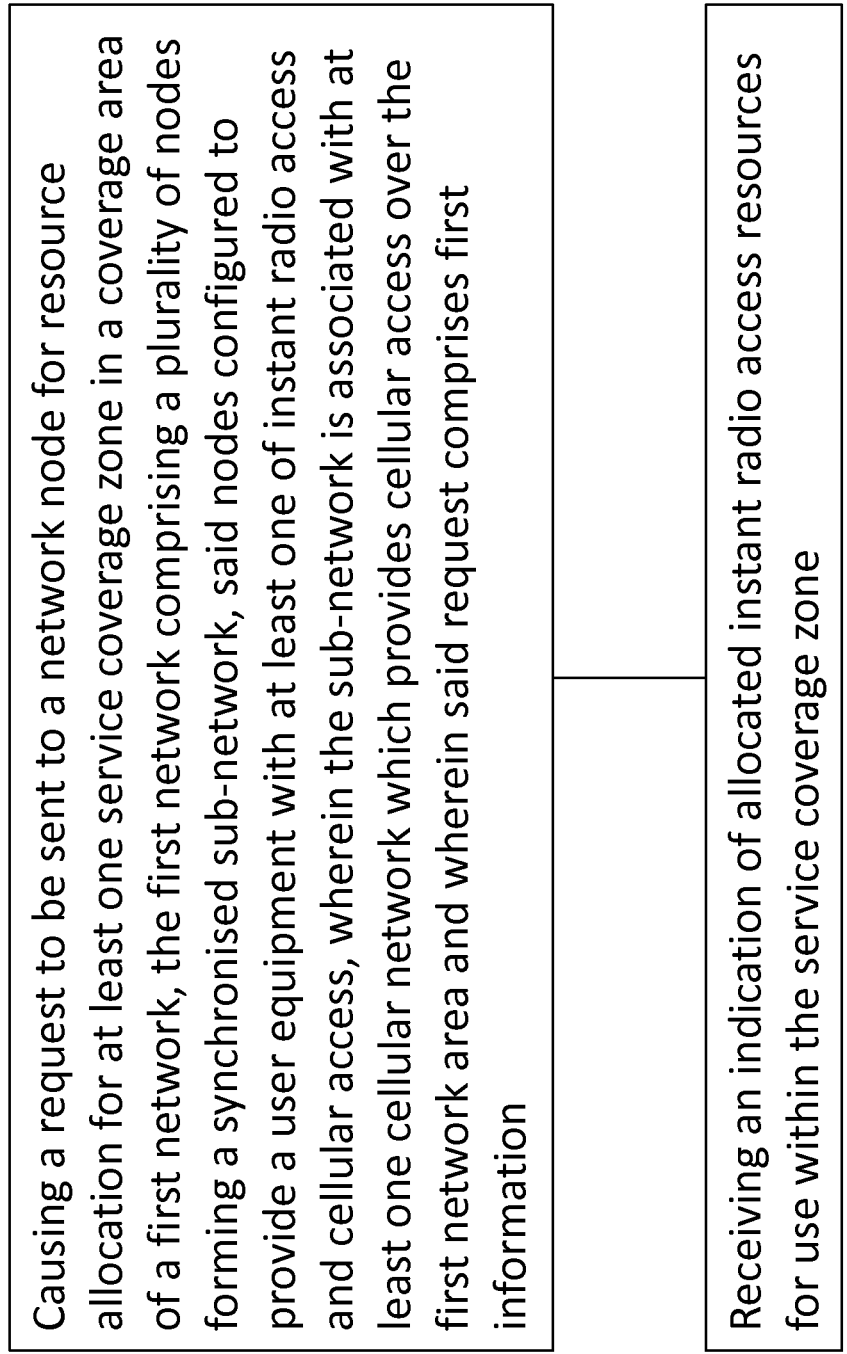
FIG. 5b shows a flowchart of an example method of resource allocation for targeted users in an SM-Zone.

FIG. 5b shows a flowchart of a method for use in resource allocation in an SM-Zone. In a first step, the method comprises causing a request to be sent to a network node for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information and, in a second step, the method comprises receiving an indication of allocated instant radio access resources for use within the service coverage zone. The network node may be referred to as a serving base station.

The serving base station may be a macro eNB or a local AN.

Allocating instant radio access resources may comprise allocating dedicated resources to a targeted user device for instant radio access transmission within a determined zone of a targeted service area in a serving cellular network comprising of at least a plural of local access nodes (AN) deployed over the targeted service area forming a synchronized sub-network.

The resource, e.g. dedicated resources and contexts, allocated to the user device are specific to the selected zone and valid throughout the selected zone until further notice.

The indication of the allocated instant access radio resources may be provided using dedicated signalling. Along with providing an indication of allocated resources, the method may comprise controlling the state of the user equipment to be maintained after the resource allocation.

The sub-network may provide a user device with either instant radio access without a need of radio connection establishment between the user device and at least one of ANs beforehand or regular cellular access with a radio connection established between the user device and at least one of ANs that is selected serving the user device or both. Instant radio access may comprise one to many broadcast based device to device communication on a preconfigured spectrum band.

A service coverage zone provides at least one service for a user device on associated radio resources over the first network area.

The sub-network may be associated with at least one cellular network. In an embodiment, the sub-network may be configured and controlled by one or more tending cellular networks which provide cellular coverage over the targeted service area for providing at least the instant radio access designated for a set of targeted applications and services for targeted users or groups of users of individual tending cellular networks, also referred to as serving cellular networks from user perspective, over at least one determined zone within the targeted service area of the sub-net, the determined zone is configured to be selectable towards targeted users or groups of users.

In one embodiment receiving a request for resource allocation from a user equipment for at least one service coverage zone in a first network area comprises a serving network, for example, a serving base station thereof, receiving from the targeted user device a request for admission control and resource allocation for a selected zone.

The first information included in the request may comprise at least one of service resource zone information, and user context information. For example, the first information may indicate specified ID of the selected zone/selected resource and user context including information elements. The information elements may be implicit or explicit as determined by the user device. Examples of information elements include momentary RSU based location and moving direction of the user device. The RSU based location may be resolved on the basis of the local cell of individual RSUs the user device is residing in and therefore may be implicitly indicated if the serving eNB is the RSU of the current local cell. The RSU based moving direction may be given implicitly as a characteristic of the selected zone, as determined and configured for the specific direction, or explicitly by the user device indicating, for example, at least one detected RSU local cell before and after the current selectable one within a preconfigured time interval. The information elements may be implicit or explicit depending on at least one predefined characteristic of the selected zone and/or whether the serving eNB to which the request is sent is a macro eNB or a local AN.

A characteristic of selected service coverage zone may be the supported resource allocation scheme of the zone. The resource allocation scheme may be, for example, either request/allocate scheme or select/reserve scheme, in which targeted user device indicates the specified ID of the selected zone to request the resource allocation in the former scheme and indicates the specified ID of selected resource of the selected zone to request the reservation of the selected resource in the latter scheme. The request from the user device may specify the need or demand for resources, either implicitly or explicitly.

Allocating instant radio access resources associated with the service coverage zone for the user equipment may comprise the serving network determining and allocating and/or reserving dedicated resources (resolvable in, e.g., time, frequency, space) to the targeted user device for the instant radio access transmission within the selected zone, coupled with controlling state of the user device toward the serving network to be maintained after the resource allocation using dedicated signalling from the serving eNB. The dedicated resources and contexts allocated to the user device may be specific to the selected zone and valid throughout the selected zone until further notice.

The determination may be based on at least one of the received request, whether the user device has parallel infrastructure remote access service or not, and at least one characteristic of the selected zone (e.g. variable physical attributes such as coverage area, road traffic direction, road traffic load, available resource pool, etc.; operational attributes such as whether the user device may be put into an idle state, e.g. RRC IDLE, if it has no other than the instant access services or kept in a connected state, e.g. RRC CONNECTED, after the allocation is completed).

The allocation may include or be linked to the selected zone on some configured minimum and/or maximum period of time for the expected lifetime of the allocated resources, triggers for monitoring and reporting or mode switching specific to the user device, as the selected zone upon specified exceptional cases or events, such as some triggering timer, time duration threshold coupled with a upper bound speed limit guarding the event that the user device is remaining in a certain local area within the selected zone for longer than expected implying, e.g., car problem, road congestion, accident, etc. This may be utilized for road monitoring applications utilizing reporting from user devices with dedicated resource allocation. The reporting (used for indicating or requesting) may be signalled to the serving eNB by using D2D or regular cellular access or both, depending on whether the user device is put into RRC IDLE or kept in RRC CONNECTED after the allocation. The user device may be assigned with a selected zone or serving zone specific RNTI, referred to as Z-RNTI, similar to C-RNTI but Z-RNTI is valid throughout the selected zone even if the user device is put back to RRC IDLE state.

The allocation and release of dedicated resources toward a user equipment (e.g. a vehicle's device or group of devices) from the serving network (including all temporary radio access network identifiers and user contexts used for instant radio access inside the admitted SM-Zone) may be carried out as an event upon the individual vehicle's entering and existing some particular SM-Zone of interest. The device may then be put back to idle mode when residing in a certain SM-Zone if no remote network access application and service is needed or conducted by the admitted user device. In an alternative, the admitted user device may be kept in connected mode of the serving macro eNB (with possible long DRX state). In one example, SM-Zone based control may be incorporated into macro-mobility procedures of RRC CONNECTED UE (S1/X2 HO procedures carrying also SM-Zone based context, configuration and control between the source and target macro eNBs). This alternative is particularly suited for implicitly visible SM-Zones In an embodiment, providing an indication of said instant radio access resources to at least one neighbouring node for use in coordination of resources with the at least one neighbouring node further comprises the serving network determining and/or coordinating the dedicated resources allocated to the targeted user device with relevant (i.e. impacted) neighbouring nodes such as eNBs and RSUs or the local resource control entity of the selected zone. The network signalling used for the coordination may indicate ID of the selected zone, the selected zone specific ID and dedicated resource allocation of the user device. The base station, e.g. eNB, or RSU may provide the indication of said instant access radio resources to the at least one neighbouring node. Alternatively, or in addition, the UE may provide the indication to the neighbouring node.

The allocation, i.e. determination and coordination, may ensure the dedicated resources allocated are valid throughout the cell and/or facilitate spatial resource reuse and optimize network resource utilization and performance. The determination may be based on at least one characteristic of the selected zone (variable physical attributes like coverage area, road traffic direction, road traffic load, available resource pool, etc.; operational attributes like whether UE is put into RRC IDLE or kept in RRC CONNECTED after the allocation, actual resource allocation is due to the serving macro eNB or the local control entity of the sub-network, etc.; and so forth). The coordination may include, e.g., indicating about the targeted user device and its dedicated resources allocated/reserved from the serving macro eNB to other relevant eNBs and/or set of RSUs providing the selected zone; and/or more extensive signalling between the serving eNB and the resource control entity of the sub-network for assigning actual resources for the dedicated resource allocation over the selected zone.

The relevant eNBs and RSUs or the local resource control entity thereof may coordinate to monitor and manage the zone based dedicated context of the user device including the validity or lifetime of the dedicated resources for possible predictive spatial resource reuse throughout the selected zone. The impacted set of RSUs may be configured to monitor and report on specified exceptional cases or event related to dedicated resource allocation, corresponding to the monitoring and reporting of the user device proposed above.

The serving macro eNB may coordinate with neighbouring macro eNBs and the add-on local access network of RSUs or ANs via, e.g., some selected individual gate-keeping RSU or AN of the SM-Zone or local control server thereof in determining and allocating the dedicated resources so as to reassure that the dedicated resource allocation to individual admitted user device or group devices is valid throughout the selected SM-Zone.

In one embodiment, upon allocating or releasing dedicated resources to the admitted user device entering the selected SM-Zone, the serving macro eNB may notify that to other relevant neighbouring eNB(s) serving along the SM-Zone so that the other macro eNBs may determine whether or not to use those assigned resources for newly admitted user devices upon entering the SM-Zone. This embodiment as such implies that the admitted user device should get connected to a serving macro eNB at least upon entering or leaving the SM Zone for indicating resource allocation or resource release request. Furthermore, as the add-on local access network of RSUs or ANs may be truly multi-tenancy or, i.e., physically shared by many serving operators' networks including possible common spectrum resources, the serving macro eNB may need to consult with the add-on local access network (selected RSU or AN, or the local network's OAM server) for actual dedicated resources upon resource allocation or release for the admitted user device in order to avoid any conflict with other tending network. The serving macro eNB may also redirect the admitted user device which is in need of dedicated resources to the add-on local access network for actual dedicated resource allocation. In this regard, the device in idle state of the serving network may be configured to reselect an available and relevant local RSU of the add-on local access network to request using certain configured SM-Zone right at the start.

Vehicles can be modelled as moving away the current serving small cell of the serving RSU, indexed as i-th, in a predictable direction within a predictable time interval depending on nature of the road (direction, speed limits, distance between 2 consecutive RSUs). In a normal traffic situation, after a certain time interval, referred to as a resource reuse time interval, the same dedicated resources allocated to the previous admitted user device when it was residing at the i-th RSU may be reused again to assign to a newly admitted user device upon arriving at the i-th RSU, as the previous user device at that time instant likely moved away from the i-th RSU and passed at least (i+j)-th RSU ahead of the i-th RSU in the SM-Zone according to the heading direction of the admitted user device.

In one embodiment, possible spatial reuse of resources for possible dedicated resource allocation within a selected SM-Zone may follow the rule given by: (i) a resource reuse time interval; and (ii) a resource reuse distance or an impacted set of RSUs ahead of the present local serving i-th RSU, indexed with {(i+1), . . . , (i+K), where K is a preconfigured integer defining the size of effected zone for the SM-Zone for representing the preconfigured spatial reuse distance}. That is, macro serving eNB and indicated neighbouring macro eNBs or the local resource control entity of the sub-net (selected gate-keeping RSU of the selected zone or overall local OAM server of the sub-network controlling all the zones over the sub-network) may need to keep track of individual admitted user devices and their contexts in a predictive fashions (reuse time interval and distance or impacted set of RSUs) to coordinate for an optimized spatial reuse of resources for the dedicated resource allocation. In a more straightforward alternative of providing spatial resource reuse, a dynamic multi-zone or multi-sub-zone spatial reuse pattern, based on the well-known 1:m frequency reuse, may be adopted.

For example, over a highway of 10 km in length and aiming for ½ spatial resource reuse with a resource reuse distance of 2 km which may be dynamically controlled based on actual traffic load and available radio resources, as these vary in different time and/or location resolutions, a multi-zone deployment of Zone#1→Zone#2→Zone#1→SM-Zone#2→Zone#1 or
a multi-sub-zone deployment of Zone#1.1→SM-Zone#1.2→Zone#1.1→SM-Zone#1.2→Zone#1.1 may be configured and used.

In the above example, it is assumed that Zone#1 (1.1) and Zone#2 (1.2) use exclusive resource pools and one zone per the resource reuse distance of 2 km is configured. In such multi-zone deployment scenario, the serving network may allocate/reserve the dedicated resource for the admitted user devices in both zones (Zone#1 and Zone#2 or Zone#1.1 and Zone#1.2) at once when user devices request the resource. A user device may be able to autonomously switch using the dedicated resource in the corresponding zones. The reuse distance may be adapted depending on available resources and traffic load in different location and different time of the day, e.g., shorter in rush hours or longer in other time of the days or in highways or freeways.

Figure 6:
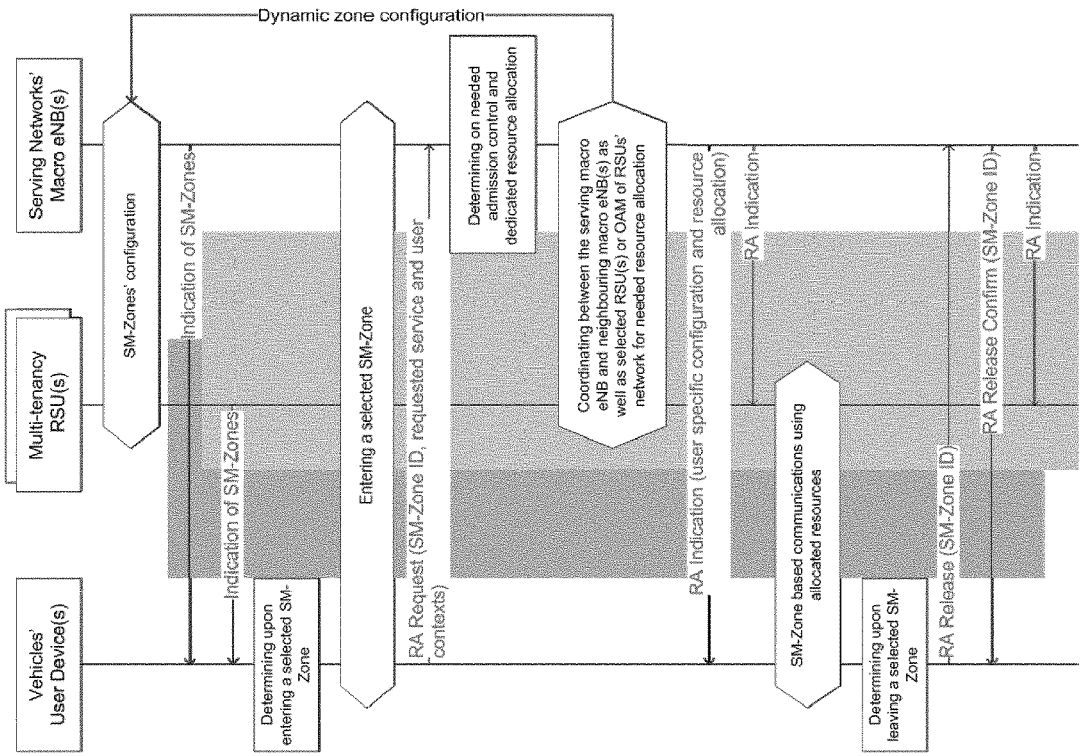
FIG. 6 shows a flowchart of an example method of resource allocation for targeted users in an SM-Zone.

FIG. 6 illustrates an example of SM-Zone based dedicated resource allocation for a given user device. In this example, the user device initiates RA Request or Release with the serving macro eNB. In an alternative, the user device may initiate RA Request or Release upon entering or leaving the SM-Zone of interest with a local serving RSU or AN and the local RSU or AN may then further the request/release toward the right serving macro serving network of the user device.

Embodiments aim for efficient supports of the targeted applications and services with minimized complexity and signalling overhead and, at the same time, maximizing resource reuse in both space and time.

Hence, these should better be provided with semi-persistent dedicated resource allocation for transmission at least, as opposed to contention based autonomous D2D transmissions on provided common pools of resources.

This proposed method makes use of the SM-Zone concept to facilitate semi-persistent dedicated resource allocation for the instant-access D2D transmission on the basis of SM-Zone and SM-Zone based mobility management.

The method includes making semi-persistent dedicated resource allocation for the instant-access D2D transmission to a certain user admitted into the given SM-Zone valid throughout the SM-Zones so as to avoid the need of at least frequent mobility management between RSUs or local ANs within the SM-Zone.

The method includes including smart user centric adaptation of the SM-Zone and coordination between the serving macro eNB and other neighbouring macro eNBs as well as RSUs over the given SM-Zone to maximize spatial resource reuse and optimize network operation and performance for vehicles' communications.

Figure 7:
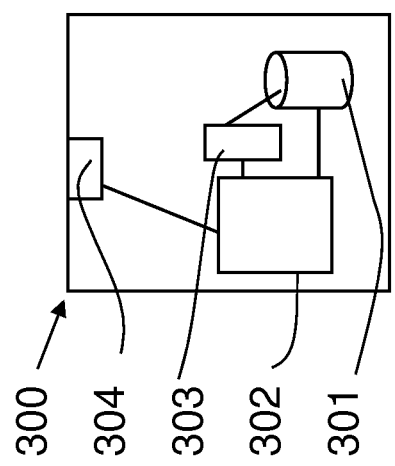
FIG. 7 shows an example of a control apparatus, according to an embodiment.

Embodiments described above by means of FIGS. 1 to 6 may be implemented on an apparatus, such as a node, host or server, or in a unit, module, etc. providing control functions as shown in FIG. 7 or on a mobile device (or in a unit, module etc. in the mobile device) such as that of FIG. 2. FIG. 7 shows an example of such an apparatus. In some embodiments, a base station comprises a separate unit or module for carrying out control functions. In other embodiments, the control functions may be provided by another network element such as a radio network controller or a spectrum controller. The apparatus 300 may be arranged to provide control on communications in the service area of the system. The apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the apparatus 300 may be configured to execute an appropriate software code to provide the control functions. Control functions may include at least receiving a request from a user equipment for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information, allocating instant radio access resources for the user equipment for use within the at least one service coverage zone and providing an indication of said instant radio access resources to said user equipment. Alternatively, or in addition, control functions may comprise causing a request to be sent to a network node for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information and receiving an indication of allocated instant radio access resources for use within the service coverage zone.

Figure 8:
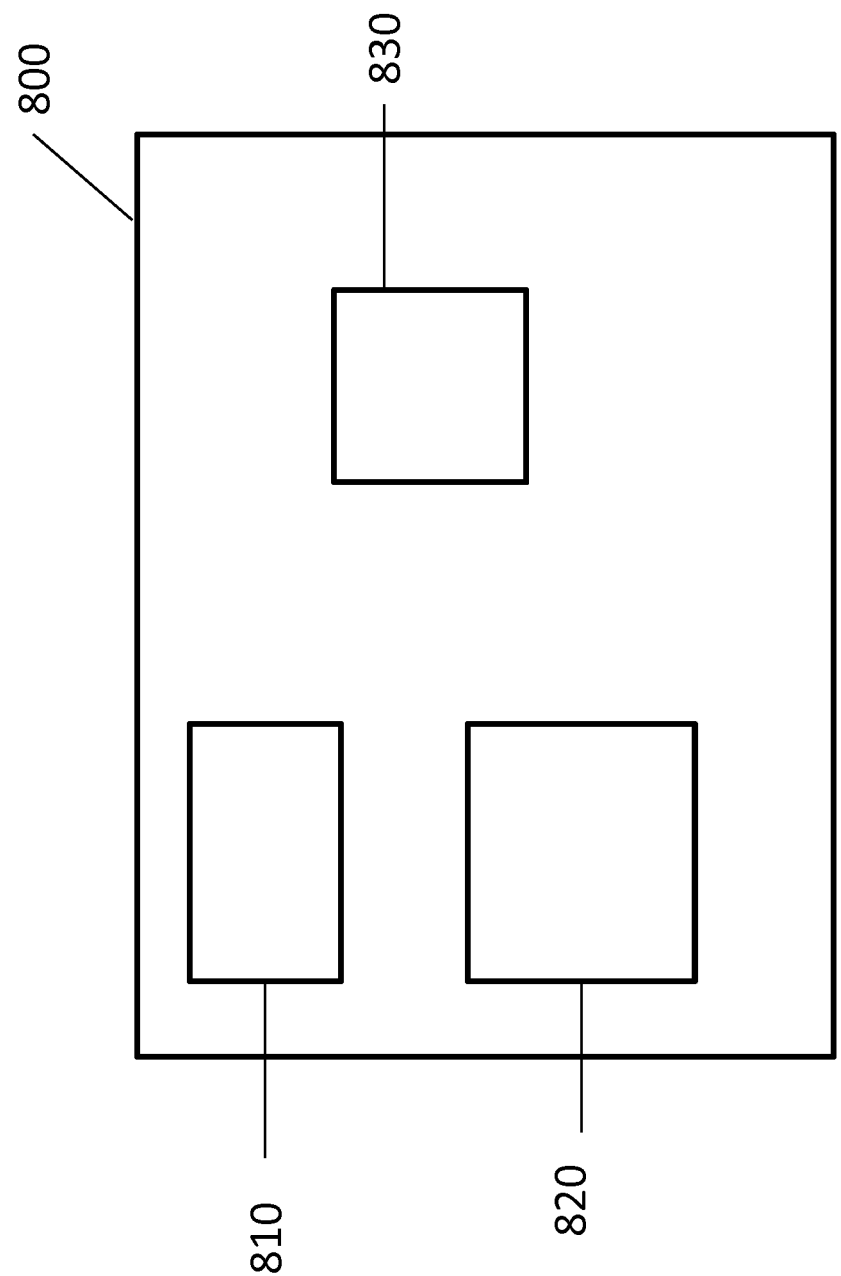
FIG. 8 shows a schematic diagram of an example apparatus.

An example of an apparatus 800, as shown in FIG. 8, may comprise means 810 for receiving a request from a user equipment for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information, means 820 for allocating instant radio access resources for the user equipment for use within the at least one service coverage zone and means 830 for providing an indication of said instant radio access resources to said user equipment.

Figure 9:
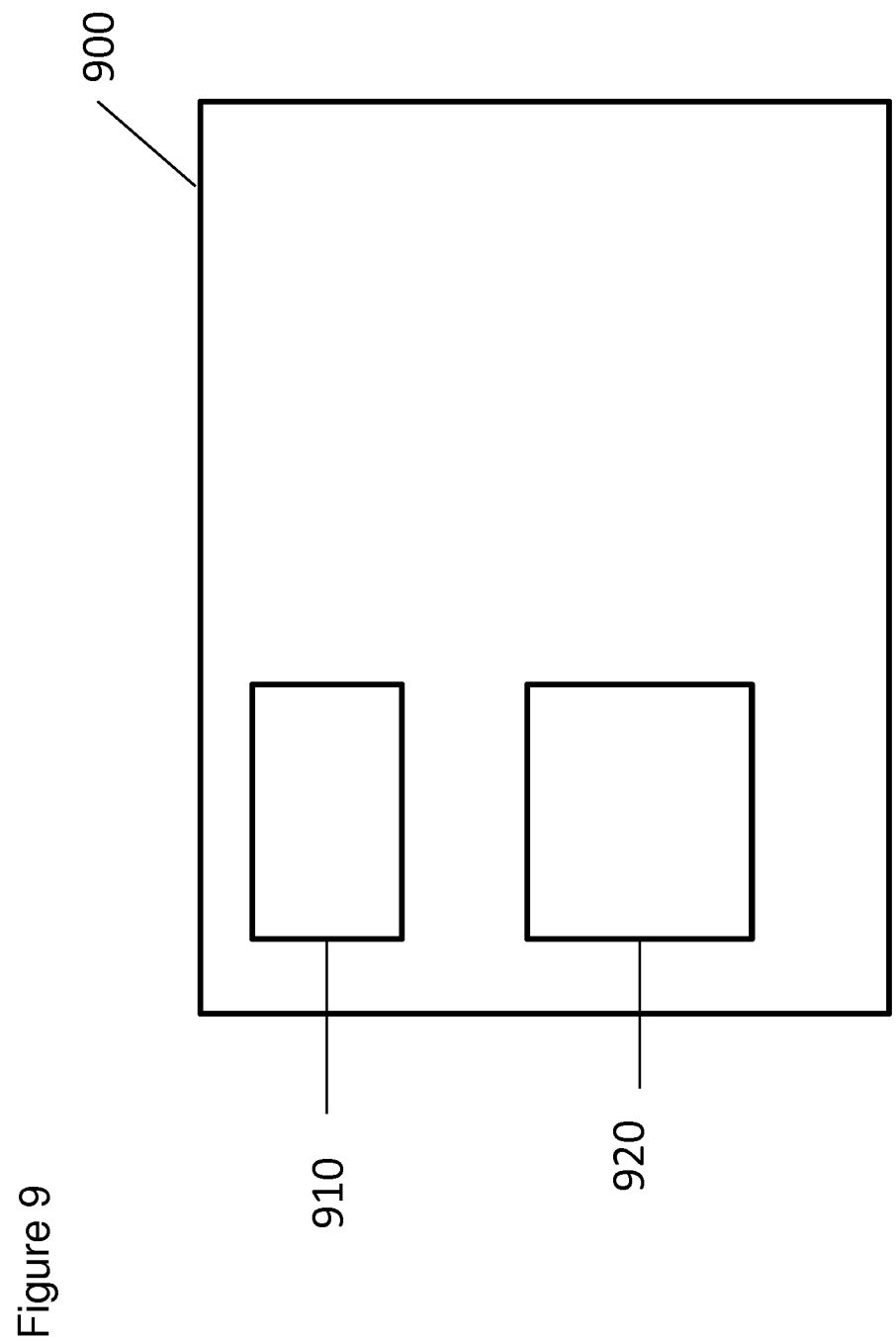
FIG. 9 shows a schematic diagram of an example apparatus.

An example of an apparatus 900, as shown in FIG. 9 may comprise means 910 for causing a request to be sent to a network node for resource allocation for at least one service coverage zone in a coverage area of a first network, the first network comprising a plurality of nodes forming a synchronised sub-network, said nodes configured to provide a user equipment with at least one of instant radio access and cellular access, wherein the sub-network is associated with at least one cellular network which provides cellular access over the first network area and wherein said request comprises first information and means 920 for receiving an indication of allocated instant radio access resources for use within the service coverage zone.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G, similar principles can be applied to any other communication system or radio access technology. Embodiments are generally applicable where V2X communication is supported. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of FIGS. 1 to 6 may be implemented by computer software executable by a data processor, at least one data processing unit or process of a device, such as a base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments described above in relation to FIGS. 1 to 6 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
receiving a request from a user equipment for resource allocation for at least one service coverage zone in a coverage area of a first network, the first network comprising a plurality of road side units forming a synchronized sub-network, said plurality of road side units configured to provide the user equipment with at least one of instant device-to-device based radio access and cellular access, wherein the sub-network is associated with at least one cellular network which provides cellular access over the coverage area of the first network, and wherein said request comprises service coverage zone and/or user context information;
allocating instant device-to-device radio access resources for the user equipment for use within the at least one service coverage zone;
providing an indication of said instant device-to-device radio access resources to said user equipment for use within the at least one service coverage zone for device-to-device communications mode between said user equipment and at least one of the plurality of road side units, and/or between said user equipment and at least one other user equipment; and
providing an indication of said allocated instant device-to-device radio access resources to at least one neighboring road side unit within the at least one coverage service zone for use in coordination of resources with the at least one neighboring road side unit.

2. The method according to claim 1, wherein the instant device-to-device based radio access comprises one to many broadcast based device to device communication using the allocated resources.

3. The method according to claim 1 wherein said allocated resources are associated with the at least one service coverage zone.

4. A method comprising:
causing, by a user equipment, a request to be sent to a network node for resource allocation for at least one service coverage zone in a coverage area of a first network, the first network comprising a plurality of road side units forming a synchronized sub-network, said plurality of road side units configured to provide the user equipment with at least one of instant device-to-device based radio access and cellular access, wherein the sub-network is associated with at least one cellular network which provides cellular access over the coverage area of the first network and wherein said request comprises service coverage zone and/or user context information;
receiving a first indication of allocated instant device-to-device radio access resources for use within the at least one service coverage zone for device-to-device based communications mode with at least one of the plurality of road side units, and/or with at least one other user equipment; and
providing a second indication of said allocated instant device-to-device radio access resources to at least one neighboring road side unit within the at least one coverage service zone for use in coordination of resources with the at least one neighboring road side unit.

5. The method according to claim 4, wherein the instant device-to-device based radio access comprises one to many broadcast based device to device communication using the allocated resources.

6. The method according to claim 4, wherein said first indication of the allocated instant device-to-device radio access resources comprises service coverage zone identity and instant radio access resource information.

7. An apparatus comprising:
at least one processor and at least one memory including a computer program code, the at least one memory and the computer program code configured to, with the at least one processor, cause the apparatus at least to:
receive a request from a user equipment for resource allocation for at least one service coverage zone in a coverage area of a first network, the first network comprising a plurality of road side units forming a synchronized sub-network, said plurality of road side units configured to provide the user equipment with at least one of instant device-to-device based radio access and cellular access, wherein the sub-network is associated with at least one cellular network which provides cellular access over the coverage area of the first network, and wherein said request comprises service coverage zone and/or user context information;
allocate instant device-to-device radio access resources for the user equipment for use within the at least one service coverage zone;
provide an indication of said instant device-to-device radio access resources to said user equipment for use within the at least one service coverage zone for device-to-device communications mode between said user equipment and at least one of the plurality of road side units, and/or between said user equipment and at least one other user equipment; and
provide an indication of said allocated instant device-to-device radio access resources to at least one neighboring road side unit within the at least one coverage service zone for use in coordination of resources with the at least one neighboring road side unit.

8. The apparatus according to claim 7, wherein the instant device-to-device based radio access comprises one to many broadcast based device to device communication using the allocated resources.

9. The apparatus according to claim 7, wherein said allocated resources are associated with the at least one service coverage zone.

10. An apparatus comprising:
at least one processor and at least one memory including a computer program code, the at least one memory and the computer program code configured to, with the at least one processor, cause the apparatus at least to:

cause, by a user equipment, a request to be sent to a network node for resource allocation for at least one service coverage zone in a coverage area of a first network, the first network comprising a plurality of road side units forming a synchronized sub-network, said plurality of road side units configured to provide the user equipment with at least one of instant device-to-device based radio access and cellular access, wherein the sub-network is associated with at least one cellular network which provides cellular access over the coverage area of the first network and wherein said request comprises service coverage zone and/or user context information;

receive a first indication of allocated instant device-to-device radio access resources for use within the at least one service coverage zone for device-to-device communications mode with at least one of the plurality of road side units, and/or with at least one other user equipment; and provide a second indication of said allocated instant device-to-device based radio access resources to at least one neighboring road side unit within the at least one coverage service zone for use in coordination of resources with the at least one neighboring road side unit.

11. The apparatus according to claim 10, wherein the instant device-to-device based radio access comprises one to many broadcast based device to device communication using the allocated resources.

* * * * *